(No Model.) 2 Sheets—Sheet 2.
F. H. BOUCHER.
MUZZLE.
No. 547,110. Patented Oct. 1, 1895.
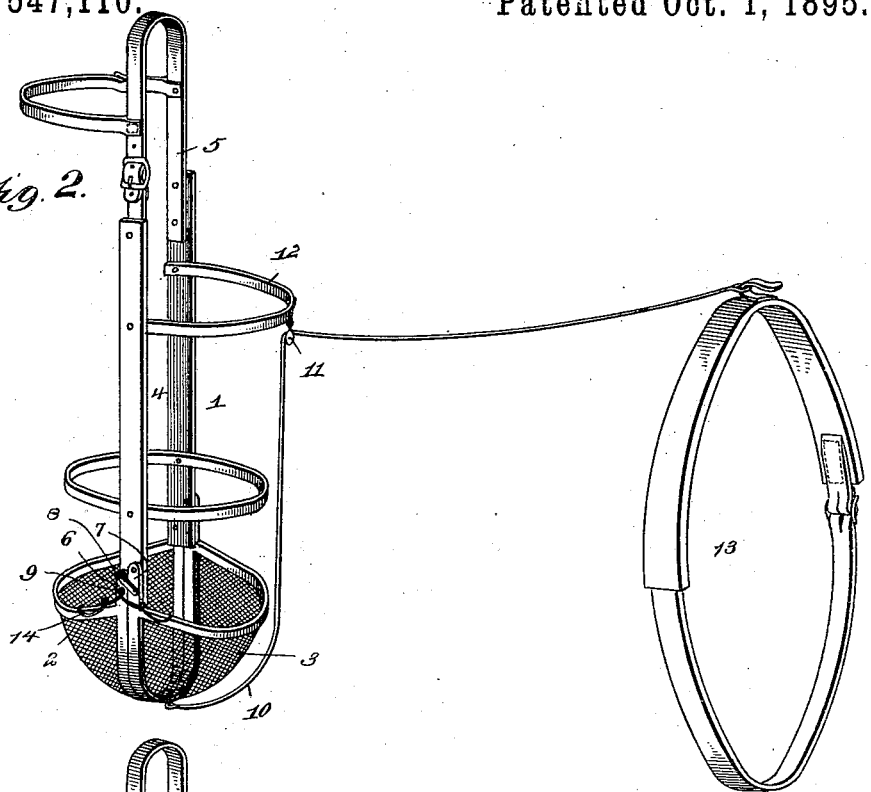
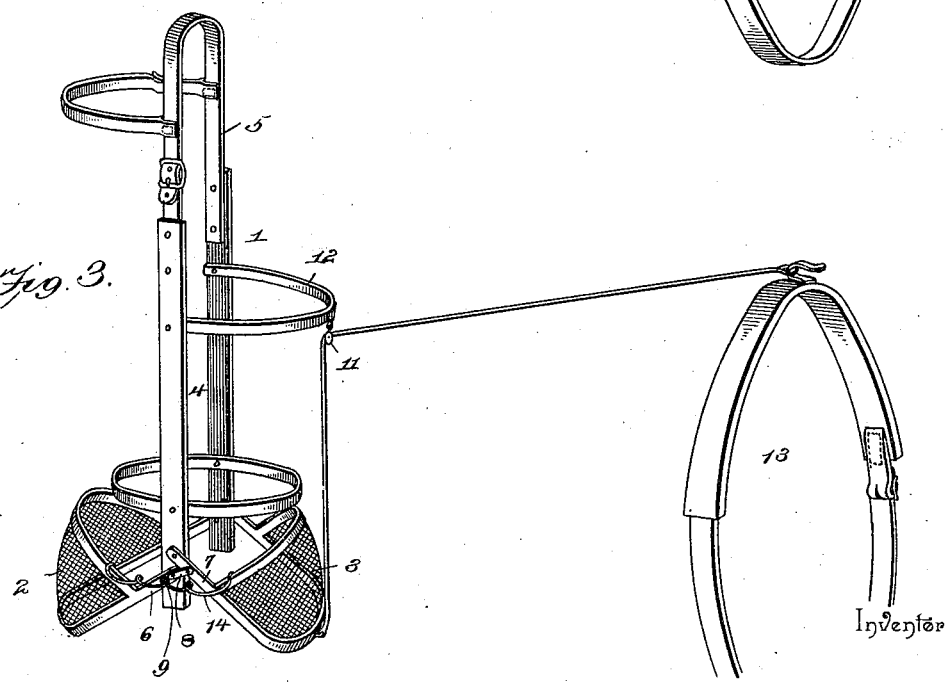
Witnesses
John C. Shaw
J. F. Riley
Inventor
Frank H. Boucher
By his Attorneys
C. A. Snow & Co.

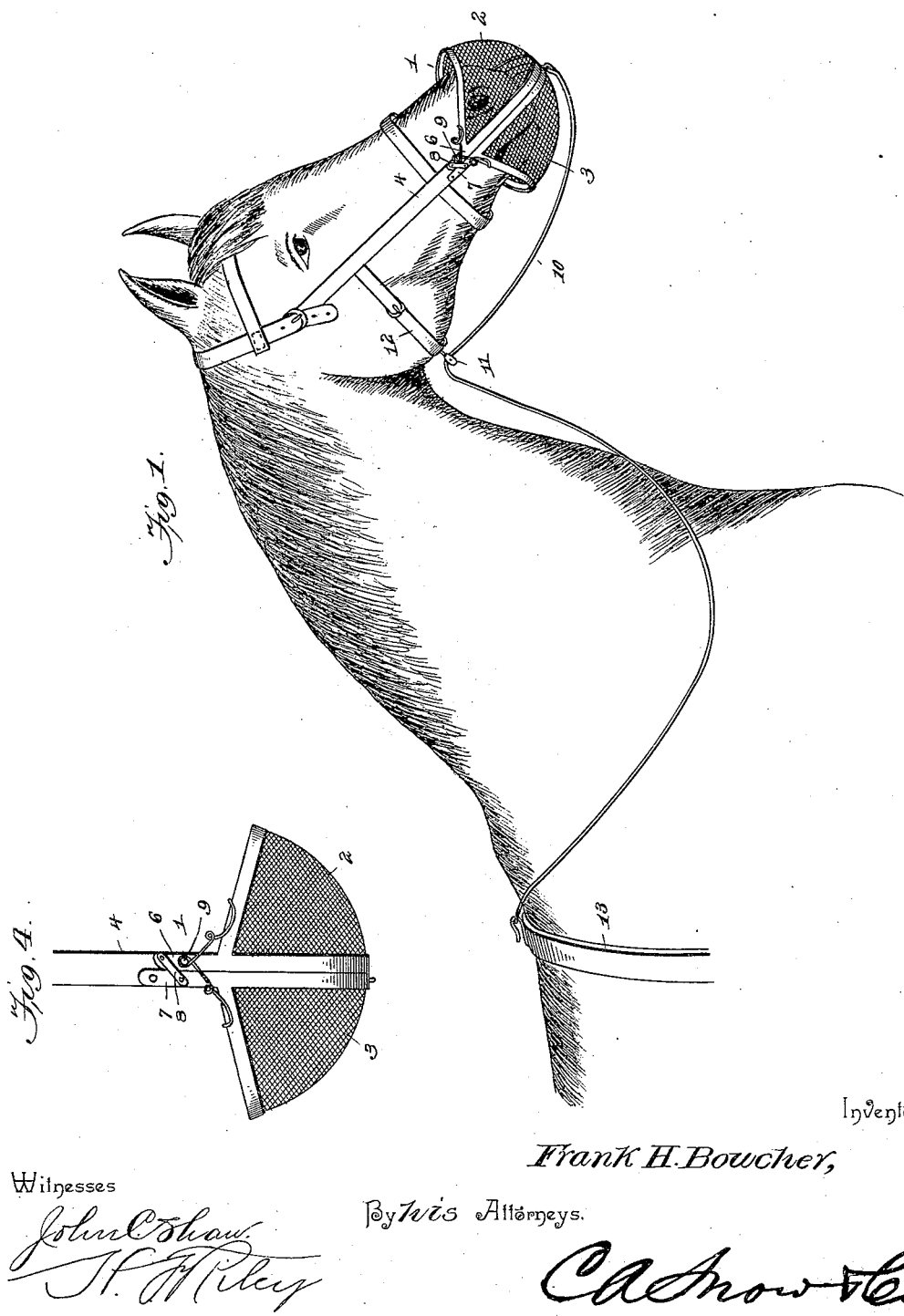

UNITED STATES PATENT OFFICE.

FRANK H. BOUCHER, OF ORLANDO, FLORIDA.

MUZZLE.

SPECIFICATION forming part of Letters Patent No. 547,110, dated October 1, 1895.

Application filed September 27, 1894. Serial No. 524,277. (No model.)

*To all whom it may concern:*

Be it known that I, FRANK H. BOUCHER, a citizen of the United States, residing near Orlando, in the county of Orange, State of Florida, have invented a new and useful Grazing-Muzzle, of which the following is a specification.

The object of the present invention is to provide a simple and efficient muzzle adapted to be readily applied to horses and other animals and capable of automatically opening when the head of an animal is lowered in the act of grazing and of similarly closing when the head of an animal is raised, whereby animals may be permitted to graze in orchards and the like without liability of damaging trees or plants.

The invention consists in the construction and novel combination and arrangement of parts hereinafter fully described, illustrated in the accompanying drawings, and pointed out in the claims hereto appended.

In the drawings, Figure 1 is a perspective view of a grazing-muzzle constructed in accordance with this invention and shown applied to an animal. Fig. 2 is a similar view of the muzzle detached and shown closed. Fig. 3 is a similar view of the muzzle being opened. Fig. 4 is an enlarged detail view of a portion of a muzzle, illustrating the manner of pivoting and connecting the muzzle-sections.

Like numerals of reference designate corresponding parts in all the figures of the drawings.

1 designates a muzzle composed of front and rear sections 2 and 3 and arranged to cover the mouth of an animal and pivotally or hingedly connected with each other and adapted to swing apart when the head of an animal is lowered in the act of grazing to permit it to have free access to all herbage. The sections 2 and 3 of the muzzle are pivoted to side pieces 4, which are attached to the sides of a halter 5, whereby the muzzle is applied to the head of an animal.

The front section of the muzzle is provided at the top, adjacent to the rear section, with an upwardly-extending arm 6, which is pivoted intermediate of its ends to the adjacent side piece 4, and the rear section of the muzzle is provided with a corresponding arm 7, pivoted at its upper end to the adjacent side piece. The arm 7 is pivotally connected at a point intermediate of its ends to the lower end of an inclined link 8, which has its upper end similarly connected to the arm 6 of the front section 2 above the pivot 9, whereby when either one of the sections is opened the other will be simultaneously opened. By this connection the sections are simultaneously swung in opposite directions by opening or closing them, whereby it will be only necessary to operate one of the sections, as the other will be operated by the same. The rear section 3 has attached to it the front end of an operating-strap or similar flexible connection 10, which passes upwardly and rearwardly to a guide 11, mounted on the strap 12 of the halter. The operating-strap extends from the guide to the back of the animal and is attached to a surcingle or band 13; but owing to the particular connection between the sections of the muzzle the operating-strap or flexible connection 10 may be attached to the front section of the muzzle and pass over the head of the animal, as will be readily understood.

The sections of the muzzle are maintained normally closed when the head of the animal is elevated above the ground by a spring 14, mounted on the pivot 9 and provided with a pair of resilient arms connected with the sections of the muzzle. This spring is substantially V-shaped, being provided at its apex with a coil to embrace the pivot 9, and having intermediate of the ends of its sides spring-coils.

It will be seen that the muzzle is exceedingly simple and inexpensive in construction, that it is positive and reliable in operation, and that it is capable of automatically opening when the head of an animal is lowered for grazing and automatically closing when the animal lifts its head from the ground, to permit animals to graze in orchards and the like without being able to injure plants or trees.

Changes in the form, proportion, and the minor details of construction may be resorted to without departing from the principle or sacrificing any of the advantages of this invention.

What I claim is—

1. In a grazing muzzle, the combination of two muzzle sections provided with arms arranged adjacent to each other, one of the arms being pivoted at its outer end, and the other being pivoted intermediate of its ends, and a link connecting the arms, and pivoted to one of them within the pivotal point and pivoted to the other beyond the pivotal point, whereby when one of the muzzle sections is swung opened or closed, the other will be simultaneously operated, substantially as described.

2. The combination with a halter, of the muzzle sections hingedly mounted and provided with arms 6 and 7, the arm 6 being pivotally connected intermediate of its ends with the halter, and the arm 7 being pivoted at its outer end to the same, a link having one end pivoted to the arm 7 intermediate of the ends thereof, and having its other end pivoted to the outer end of the arm 6, a spring for closing the sections, and an operating strap connected with one of the sections of the muzzle and designed to be connected with the back of an animal, substantially as described.

3. The combination with a halter, of side pieces secured to the same, the hinged muzzle sections mounted on the side pieces, and provided with arms 6 and 7, the arm 6 being pivoted intermediate of its ends, and the other arm being pivoted at its outer end, the inclined link pivotally connected to the arms at opposite sides of the pivotal points, the substantially V-shaped spring connected with the muzzle sections, and provided intermediate of the ends, or of its sides with coils, and means for operating one of the sections of the muzzle, substantially as described.

4. The combination of a halter, having a strap 12, and provided at that point with a guide, the front and rear muzzle sections pivotally connected with the halter and provided with arms 6 and 7, the link connecting the arms and arranged at opposite sides of the pivoted points thereof, a band 13 designed to encircle an animal in rear of the neck, a spring for closing the muzzle sections, and an operating strap passing through said guide, and having one end connected to the rear section of the muzzle and its other end attached to said band, substantially as described.

FRANK H. BOUCHER.

Witnesses:
E. W. HEUCK,
JAMES W. WILMOTT.